United States Patent
Takahashi et al.

(10) Patent No.: US 8,885,543 B2
(45) Date of Patent: Nov. 11, 2014

(54) MOBILE COMMUNICATION METHOD AND RELAY NODE

(75) Inventors: Hideaki Takahashi, Yokohama (JP); Wuri Andarmawanti Hapsari, Yokosuka (JP); Anil Umesh, Yokohama (JP); Mikio Iwamura, Tokyo (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 135 days.

(21) Appl. No.: 13/500,081

(22) PCT Filed: Oct. 5, 2010

(86) PCT No.: PCT/JP2010/067430
§ 371 (c)(1),
(2), (4) Date: Jul. 3, 2012

(87) PCT Pub. No.: WO2011/043325
PCT Pub. Date: Apr. 14, 2011

(65) Prior Publication Data
US 2012/0263098 A1  Oct. 18, 2012

(30) Foreign Application Priority Data
Oct. 5, 2009  (JP) ................. P2009-231721

(51) Int. Cl.
H04B 7/155  (2006.01)
(52) U.S. Cl.
CPC ..................... *H04B 7/155* (2013.01)
USPC ........................................ 370/315
(58) Field of Classification Search
None
See application file for complete search history.

(56) References Cited

U.S. PATENT DOCUMENTS

| 2005/0130587 | A1* | 6/2005 | Suda et al. ................ 455/9 |
| 2008/0056172 | A1* | 3/2008 | Nakatsugawa ............ 370/315 |
| 2008/0069033 | A1* | 3/2008 | Li et al. .................... 370/328 |
| 2008/0219229 | A1* | 9/2008 | Zheng ....................... 370/338 |

(Continued)

FOREIGN PATENT DOCUMENTS

| JP | 2007-517416 A | 6/2007 |
| JP | 2007-184935 A | 7/2007 |

(Continued)

OTHER PUBLICATIONS

International Search Report w/translation from PCT/JP2010/067430 dated Jan. 11, 2011 (2 pages).

(Continued)

*Primary Examiner* — Chirag Shah
*Assistant Examiner* — Rina Pancholi
(74) *Attorney, Agent, or Firm* — Osha Liang LLP

(57) ABSTRACT

Interference to a reception circuit of a relay node itself is reduced, which occurs when transmission-and-reception process in a Un radio bearer and transmission-and-reception process in a Uu radio bearer are simultaneously performed. A mobile communication method according to the present invention includes a step of determining, by a relay node RN, whether it is necessary to perform the scheduling of a second timing such that the second timing does not overlap a first timing in a time direction, based on a first operating frequency f1 used in a radio zone between the relay node RN and a mobile station UE and a second operating frequency f2 used in a radio zone between a radio base station DeNB and the relay node RN, and a step of notifying, by the relay node RN, the radio base station DeNB of the determination result.

8 Claims, 7 Drawing Sheets

(56) References Cited

U.S. PATENT DOCUMENTS

| | | | | |
|---|---|---|---|---|
| 2009/0186645 | A1* | 7/2009 | Jaturong et al. | 455/507 |
| 2009/0252075 | A1* | 10/2009 | Ji et al. | 370/312 |
| 2010/0110964 | A1* | 5/2010 | Love et al. | 370/312 |
| 2011/0170475 | A1* | 7/2011 | Raaf | 370/315 |
| 2012/0051283 | A1* | 3/2012 | Takahashi et al. | 370/315 |
| 2012/0147809 | A1* | 6/2012 | Takahashi et al. | 370/315 |
| 2012/0176955 | A1* | 7/2012 | Ishii et al. | 370/315 |

FOREIGN PATENT DOCUMENTS

| | | | | |
|---|---|---|---|---|
| WO | 2005/067173 | A1 | 7/2005 | |
| WO | 2007105089 | A2 | 9/2007 | |
| WO | 2008072062 | A2 | 6/2008 | |
| WO | WO 2011/026224 | * | 3/2011 | H04B 7/15 |

OTHER PUBLICATIONS

3GPP TS 36.300 v10.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Jun. 2010 (183 pages).

3GPP TR 36.814 v9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (105 pages).

3GPP TS 36.331 v8.6.0; "3rd Generation Partnership Project; Technical Specification Group Radio Access Network; Evolved Universal Terrestrial Radio Access (E-UTRA) Radio Resource Control (RRC); Protocol specification (Release 8)"; Jun. 2009 (207 pages).

3GPP TSG-RAN WG1 #55, R1-084686; "Updated WF on addressing forard compativility in Rel-8"; AT*T et al.; Prague, Czech Republic; Nov. 10-14, 2008 (1 page).

Office Action in corresponding Canadian Application No. 2782073 dated Apr. 9, 2013 (3 pages).

Parkvall et al; "The Evolution of LTE towards IMT-Advanced"; Journal of Coummunications, vol. 4, No. 3, pp. 146-154, Apr. 2009 (9 pages).

Soldani et al.; "IEEE Communications Magazine"; pp. 58-66; Mar. 2008 (9 pages).

"Relays in wireless communication systems"; Website by Wireless Signal Processing Group at Department of Signal Processing and Acoustics, School of Electrical Engineering, Aalto University; <https://sites.google.com/site/tkksigresearch/Home/research/relays>; Mar. 11, 2009.

Office Action in corresponding Japanese Application No. 2009-231721, dated Dec. 19, 2012, with English translation thereof (7 pages).

Canadian Office Action issued in Canadian Patent Application No. 2,782,073, mailing date Nov. 15, 2014 (3 pages).

Chinese Office Action issued in Chinese Patent Application No. 201080044852.0, mailing date Nov. 13, 2014, with English translation thereof (10 pages).

3GPP TR 36.814, V0.4.1, "3rd Generation Partnership Project; Technical Specification Group Radio Access Network; Further Advancements for E-UTRA Physical Layer Aspects (Release 9);" Feb. 2009 (31 pages).

Office Action in counterpart Chinese Patent Application No. 201080044852.0, mailed May 7, 2014 (12 pages).

Extended European Search Report in counterpart European Patent Application No. 10821995.7, mailed May 5, 2014 (7 pages).

Riihonen T. et al.; "On the Feasibility of Full-Duplex Relaying in the Presence of Loop Interference"; IEEE, pp. 57-61; Jun. 21, 2009 (5 pages).

Office Action in counterpart Canadian Patent Application No. 2,782,073, mailed May 15, 2014 (3 pages).

\* cited by examiner

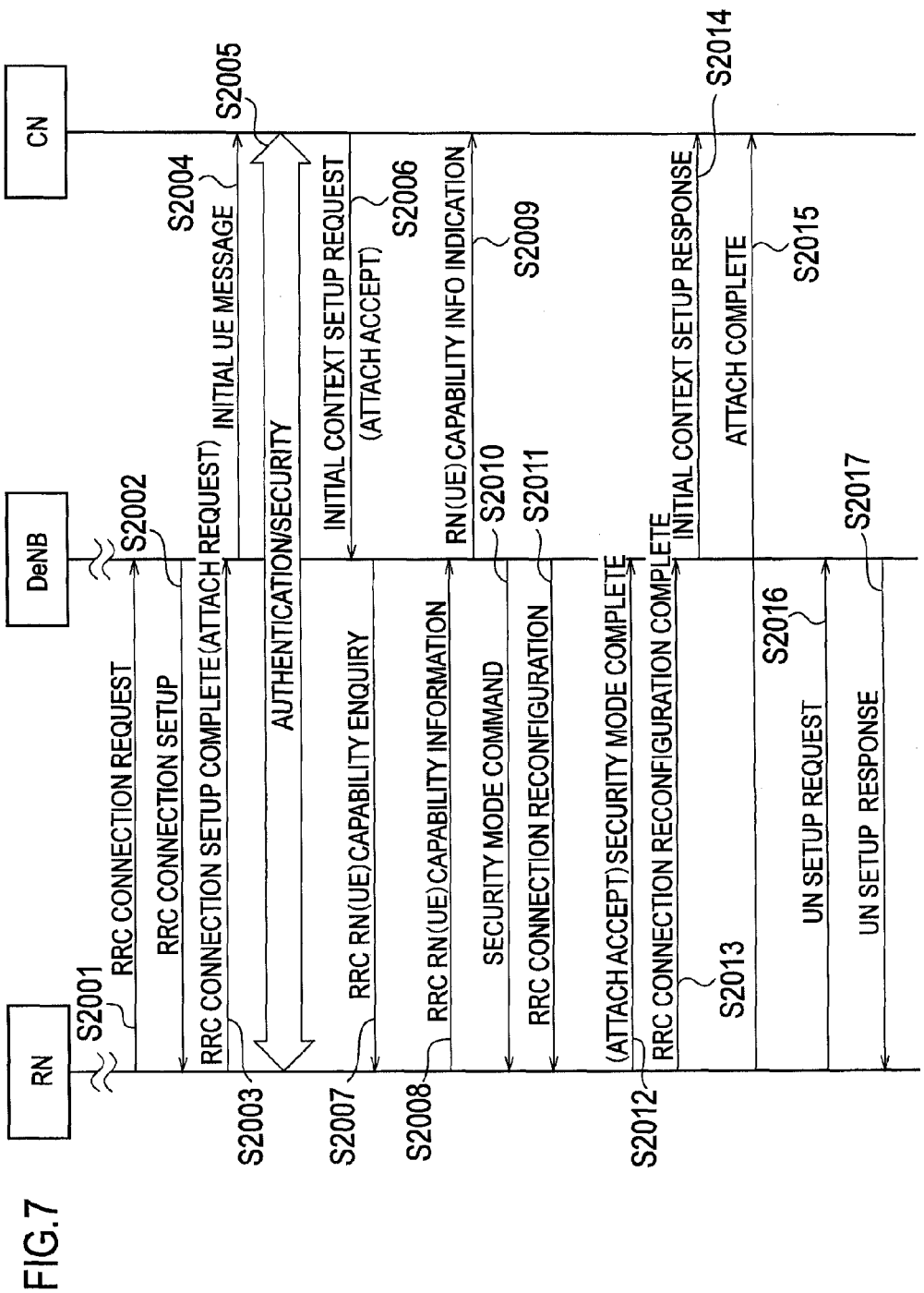

US 8,885,543 B2

MOBILE COMMUNICATION METHOD AND RELAY NODE

TECHNICAL FIELD

The present invention relates to a mobile communication method and a relay node.

BACKGROUND ART

In a mobile communication system employing an LTE (Long Term Evolution)-Advanced scheme which is the next generation of an LTE scheme, a "relay node RN" having the same function as that of a radio base station DeNB (Donor eNB) may be connected between a mobile station UE and the radio base station DeNB.

The LTE-Advanced mobile communication system is configured such that E-RAB (E-UTRAN Radio Access Bearer) is set between the mobile station UE and a core node CN (Core Node), a Uu radio bearer is set between the mobile station UE and the relay node RN, a Un radio bearer is set between the relay node RN and the radio base station DeNB, and an S1 bearer is set between the radio base station DeNB and the core node CN.

However, in the mobile communication system, when a process (a reception process in the Un radio bearer) of receiving by the relay node RN a downlink signal from the radio base station DeNB is simultaneously performed with a process (a transmission process in the Uu radio bearer) of transmitting by the relay node RN a downlink signal to the mobile station UE, or a process (a reception process in the Uu radio bearer) of receiving by the relay node RN an uplink signal from the mobile station UE is simultaneously performed with a process (a transmission process in the Un radio bearer) of transmitting by the relay node RN an uplink signal to the radio base station DeNB, a transmission signal of the relay node RN may loop around its own reception circuit, resulting in a problem that interference occurs.

SUMMARY OF THE INVENTION

Therefore, the present invention has been achieved in view of the above-described problems, and an object thereof is to provide a mobile communication method capable of reducing interference to a reception circuit of a relay node itself, which occurs when a transmission-and-reception process in a Un radio bearer and transmission-and-reception process in a Uu radio bearer are simultaneously performed, and a relay node.

A first characteristic of the present embodiment is summarized in that a mobile communication method, comprising, a step A of performing, by a radio base station, scheduling such that a first downlink signal is transmitted to a relay node at a first timing, a step B of performing, by the relay node, scheduling such that a second downlink signal is transmitted to a mobile station at a second timing, a step C of determining, by the relay node, whether it is necessary to perform scheduling at the second timing such that the second timing does not overlap the first timing in a time direction, based on a first operating frequency used in a radio zone between the relay node and the mobile station and a second operating frequency used in a radio zone between the radio base station and the relay node, and a step D of notifying, by the relay node, the radio base station of the determination result.

A second characteristic of the present embodiment is summarized in that a relay node, which can set a connection between a radio base station and the relay node, the relay node comprising, a reception unit configured to receive a first downlink signal transmitted from the radio base station at a first timing, a scheduling unit configured to perform scheduling such that a second downlink signal is transmitted to a mobile station at a second timing, a determination unit configured to determine whether it is necessary to perform scheduling at the second timing such that the second timing does not overlap the first timing in a time direction, based on a first operating frequency used in a radio zone between the relay node and the mobile station and a second operating frequency used in a radio zone between the radio base station and the relay node, and a transmission unit configured to notify the radio base station of the determination result.

BRIEF DESCRIPTION OF THE DRAWINGS

FIG. 7 is a sequence diagram illustrating an operation of the mobile communication system according to the first modification of the present invention.

DETAILED DESCRIPTION

Configuration of Mobile Communication System according to first embodiment of the present invention The configuration of a mobile communication system according to a first embodiment of the present invention will be described with reference to FIGS. 1 to 4.

Figure 1:
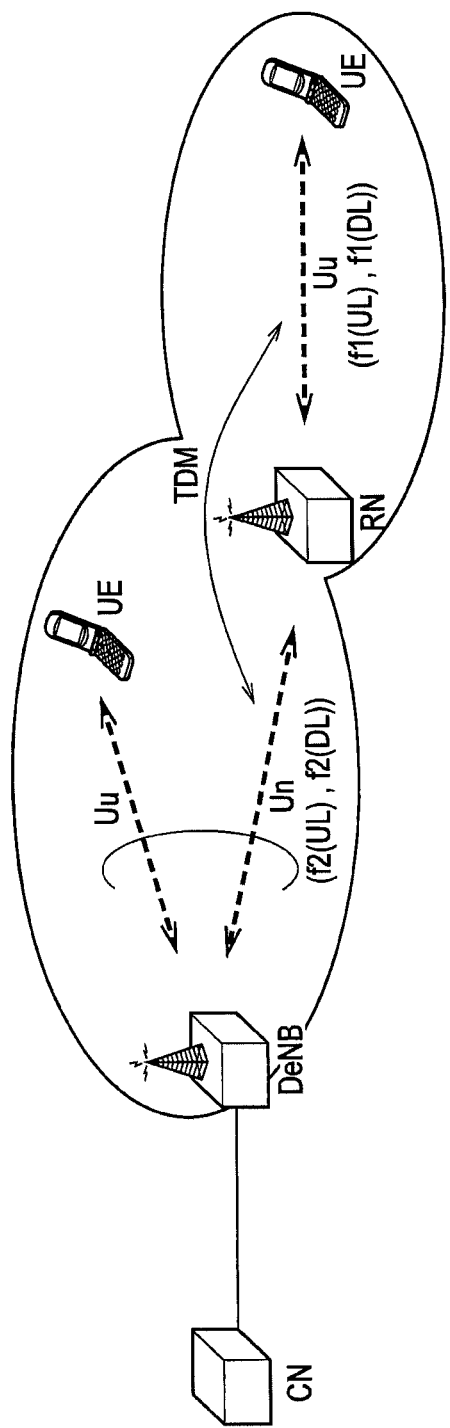
FIG. 1 is a diagram showing the entire configuration of a mobile communication system according to a first embodiment of the present invention.

As illustrated in FIG. 1, the mobile communication system according to the present embodiment is an LTE-Advanced mobile communication system, and includes a core node (e.g., a gateway device S-GW, a mobile switching center MME and the like) in a core network node, a radio base station DeNB, a relay node RN and the like.

Here, in the example of FIG. 1, a Uu radio bearer is set between the radio base station DeNB and a mobile station UE, a Un radio bearer is set between the radio base station DeNB and the relay node RN, and the Uu radio bearer is set between the relay node RN and the mobile station UE.

In addition, a first operating frequency used in a radio zone between the relay node RN and the mobile station UE is "f1" (an upward direction is "f1(UL)" and a downward direction is "f1(DL)"), and a second operating frequency used in a radio zone between the radio base station DeNB and the relay node RN is "f2" (an upward direction is "f2(UL)" and a downward direction is "f2(DL)").

Furthermore, when it is determined that it is necessary to switch a resource for reception of a first downlink signal and a resource for transmission of a second downlink signal in a time division manner as will be described later, it is assumed that SFN (System Frame Number) synchronization is made between the radio base station DeNB and the relay node RN.

That is, when it is determined that it is necessary to switch the resource for reception of the first downlink signal and the resource for transmission of the second downlink signal in the time division manner as will be described later, the relay node RN is configured to make synchronization for the radio base station DeNB at an SFN level based on SFN included in broadcast information transmitted by the radio base station DeNB.

Furthermore, when it is determined that it is necessary to switch the resource for reception of the first downlink signal and the resource for transmission of the second downlink signal in the time division manner and when the SFN synchronization has not been made between the radio base station DeNB and the relay node RN as will be described later, the radio base station DeNB is configured to understand the number of frames by which SFN of a radio frame transmitted by the radio base station DeNB is shifted from SFN of a radio frame transmitted by the relay node RN at the same time.

Furthermore, the radio base station DeNB and the relay node RN are configured to transmit an uplink signal and a downlink signal in a time division multiplexing manner.

Figure 2:
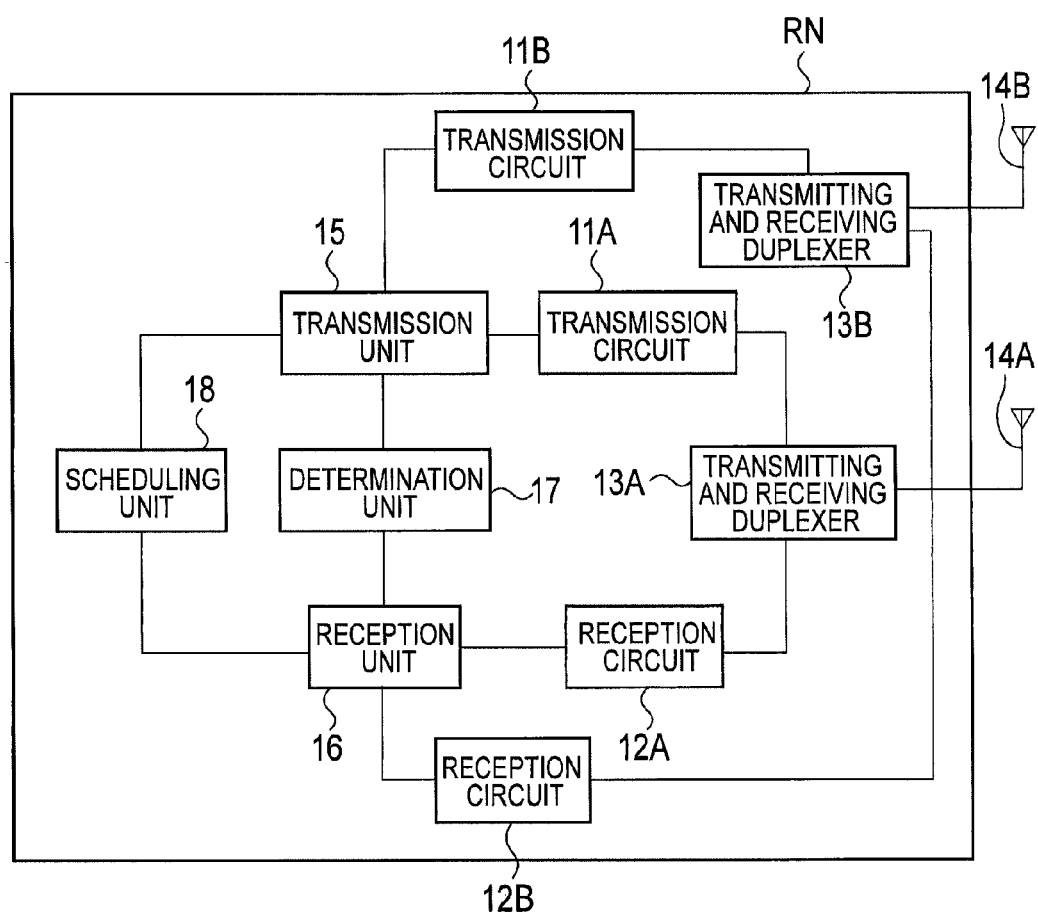
FIG. 2 is a functional block diagram of a relay node according to the first embodiment of the present invention.
Figure 3:
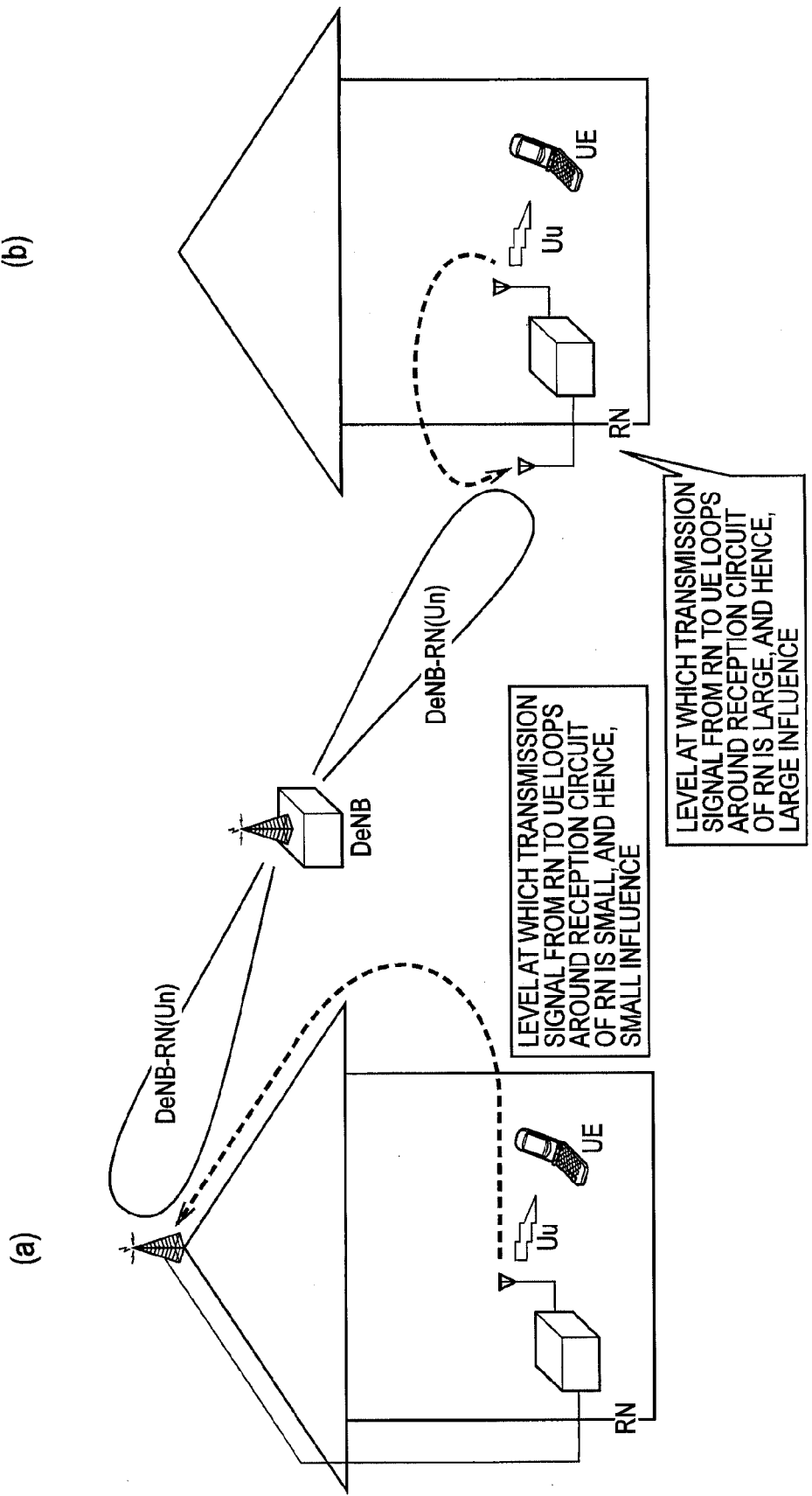
FIG. 3 is a diagram explaining the influence occurring when a transmission signal in the relay node according to the first embodiment of the present invention loops around a reception circuit.

As illustrated in FIG. 2, the relay node RN includes a transmission circuit 11A for a Un radio bearer, a reception circuit 12A for a Un radio bearer, a transmitting and receiving duplexer 13A for a Un radio bearer, a transmitting and receiving antenna 14A for a Un radio bearer, a transmission circuit 11B for a Uu radio bearer, a reception circuit 12B for a Uu radio bearer, a transmitting and receiving duplexer 13B for a Uu radio bearer, a transmitting and receiving antenna 14B for a Uu radio bearer, a transmission unit 15, a reception unit 16, a determination unit 17, and a scheduling unit 18.

The reception unit 16 is configured to receive a first downlink signal, which has been transmitted from the radio base station DeNB at a first timing through the Un radio bearer, by using the transmitting and receiving antenna 14A for a Un radio bearer and the reception circuit 12A for a Un radio bearer.

Furthermore, the reception unit 16 is configured to receive an uplink signal, which has been transmitted from the mobile station UE through the Uu radio bearer, by using the transmitting and receiving antenna 14B for a Uu radio bearer and the reception circuit 12B for a Uu radio bearer.

Furthermore, the reception unit 16 is configured to receive a transmission timing of an MBSFN subframe from the radio base station DeNB as the first timing by using the transmitting and receiving antenna 14A for a Un radio bearer and the reception circuit 12A for a Un radio bearer when an RRC connection is set between the radio base station DeNB and the relay node RN.

For example, the reception unit 16 may also be configured to receive the transmission timing of the MBSFN (Multicast Broadcast Single Frequency Network) subframe from "RRC Connection Reconfiguration" which is transmitted in an existing setup procedure of an RRC connection.

Here, the MBSFN subframe is a subframe used in MBSFN communication. In addition, in the present specification, it is assumed that the MBSFN subframe also includes an MBSFN subframe defined such that an OFDM symbol for a control signal called "Blank subframe" in the 3GPP meeting is not transmitted.

The transmission unit 15 is configured to transmit an uplink single to the radio base station DeNB through the Un radio bearer by using the transmitting and receiving antenna 14A for a Un radio bearer and the transmission circuit 11A for a Un radio bearer.

Furthermore, the transmission unit 15 is configured to transmit a second downlink single to the mobile station UE through the Uu radio bearer by using the transmitting and receiving antenna 14B for a Uu radio bearer and the transmission circuit 11B for a Uu radio bearer.

The scheduling unit 18 is configured to perform scheduling for the mobile station UE subordinate to the relay node RN based on a determination result of the determination unit 17.

For example, based on the determination result of the determination unit 17, the scheduling unit 18 may also be configured to perform scheduling such that the second downlink signal is transmitted at a timing (a second timing) other than the transmission timing (the first timing) of the MBSFN subframe.

The determination unit 17 is configured to determine whether it is necessary to perform scheduling at the second timing such that the second timing does not overlap the first timing in the time direction, based on the first operating frequency f1 used in the radio zone between the relay node RN and the mobile station UE and the second operating frequency f2 used in the radio zone between the radio base station DeNB and the relay node RN.

That is, based on the first operating frequency f1 and the second operating frequency f2, the determination unit 17 is configured to determine whether it is necessary to switch the resource for reception of the first downlink signal and the resource for transmission of the second downlink signal in the time division manner, wherein the resource for reception of the first downlink signal is transmitted by the radio base station DeNB through the Un radio bearer and the resource for transmission of the second downlink signal is transmitted to the mobile station UE through the Uu radio bearer.

Specifically, when the first operating frequency f1 is different from the second operating frequency f2, the determination unit 17 may also be configured to determine that it is not necessary to perform the scheduling at the second timing such that the second timing does not overlap the first timing in the time direction.

Furthermore, even when the first operating frequency f1 is equal to the second operating frequency f2, the determination unit 17 may also be configured to determine that it is not necessary to perform the scheduling at the second timing such that the second timing does not overlap the first timing in the time direction if the providing of the transmitting and receiving duplexer 13A for a Un radio bearer with high performance has been set, wherein it is possible for the transmitting and receiving duplexer 13A to sufficiently prevent the second downlink signal from looping around the reception circuit 12A for a Un radio bearer, that is, can guarantee isolation capable of sufficiently preventing the second downlink signal from looping around the reception circuit 12A for a Un radio bearer.

As illustrated in FIG. 3(a), when the transmitting and receiving antenna 14A for a Un radio bearer of the relay node RN is installed to be separated spatially from the transmitting and receiving antenna 14B for a Uu radio bearer of the relay node RN (for example, when the relay node RN is installed in a house, the transmitting and receiving antenna 14A for a Un radio bearer is installed on a roof of the house, and the transmitting and receiving antenna 14B for a Uu radio bearer is integrally installed with the relay node RN, and the like), since a loop level of the second downlink signal to the reception circuit 12A for a Un radio bearer is reduced, it is possible to set so that the second downlink signal can be sufficiently prevented from looping around the reception circuit 12A for a Un radio bearer in the relay node RN.

Meanwhile, as illustrated in FIG. 3(b), when the transmitting and receiving antenna 14A for a Un radio bearer of the relay node RN is installed to be spatially adjacent to the transmitting and receiving antenna 14B for a Uu radio bearer of the relay node RN (for example, when the relay node RN is installed in a house, and the transmitting and receiving antenna 14A for a Un radio bearer and the transmitting and receiving antenna 14B for a Uu radio bearer are integrally installed with the relay node RN, and the like), since the loop level of the second downlink signal to the reception circuit 12A for a Un radio bearer is increased, it is possible to set so that the second downlink signal cannot be sufficiently prevented from looping around the reception circuit 12A for a Un radio bearer in the relay node RN.

In addition, the determination unit 17 may also be configured to perform the above-mentioned determination at the time of activation of the relay node RN.

Here, the transmission unit 15 is configured to notify the radio base station DeNB of the determination result of the determination unit 17 by using the transmitting and receiving antenna 14A for a Un radio bearer and the transmission circuit 11A for a Un radio bearer.

Furthermore, the transmission unit 15 may also be configured to transmit "RRC Connection Request" to the radio base station DeNB, other than by the mobile station UE, in the setup procedure of the RRC connection, wherein the "RRC Connection Request" includes information indicating that the "RRC Connection Request" has been transmitted by the relay node RN.

Figure 4:
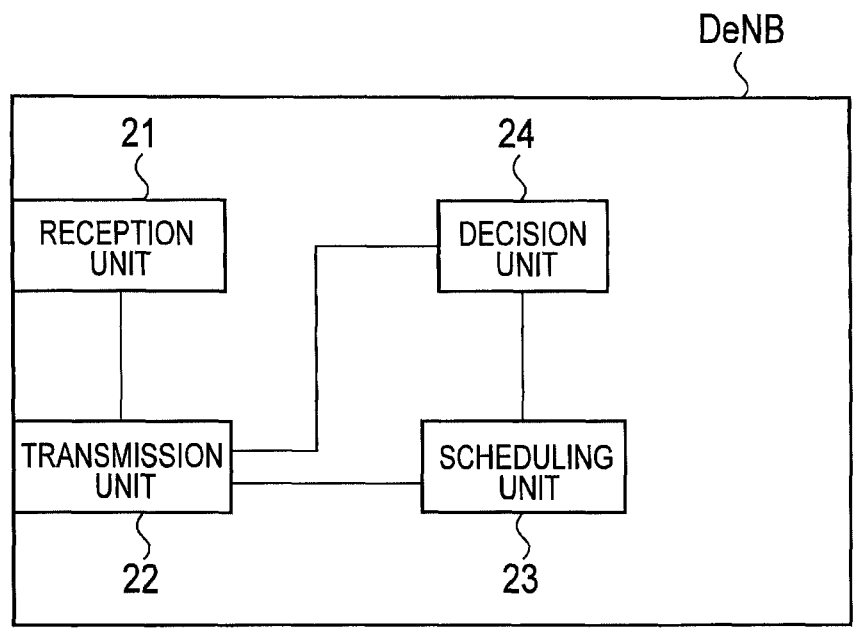
FIG. 4 is a functional block diagram of a radio base station according to the first embodiment of the present invention.

As illustrated in FIG. 4, the radio base station DeNB includes a reception unit 21, a transmission unit 22, a scheduling unit 23, and a decision unit 24.

The reception unit 21 is configured to receive the uplink signal transmitted from the relay node RN through the Un radio bearer, the uplink signal transmitted from the mobile station UE through the Uu radio bearer, or the downlink signal transmitted from the core node CN.

For example, the reception unit 21 is configured to receive the "RRC Connection Request" and the like transmitted from the relay node RN in the setup procedure of the RRC connection between the radio base station DeNB and the relay node RN.

The transmission unit 22 is configured to transmit a downlink signal to the relay node RN through the Un radio bearer, transmit a downlink signal to the mobile station UE through the Uu radio bearer, and transmit an uplink signal to the core node CN.

Furthermore, in the case of setting the RRC connection between the radio base station DeNB and the relay node RN, when the relay node RN has notified the radio base station DeNB of a determination result indicating that it is necessary to perform the scheduling at the second timing such that the second timing does not overlap the first timing in the time direction, the transmission unit 22 is configured to notify the relay node RN of a transmission timing (a predetermined timing) of the MBSFN subframe.

Here, the transmission unit 22 may also be configured to notify the relay node RN of the transmission timing of the MBSFN subframe only when a transmission source of the "RRC Connection Request" received in the reception unit 21 is the relay node RN.

Meanwhile, in the case of setting the RRC connection between the radio base station DeNB and the relay node RN, when the relay node RN has notified the radio base station DeNB of a determination result indicating that it is not necessary to perform the scheduling at the second timing such that the second timing does not overlap the first timing in the time direction, the transmission unit 22 is configured not to notify the relay node RN of the transmission timing (the predetermined timing) of the MBSFN subframe.

The decision unit 24 is configured to decide the transmission timing of the MBSFN subframe to be notified to the relay node RN.

For example, the decision unit 24 is configured to decide the transmission timing of the MBSFN subframe to be notified to the relay node RN in consideration of the number of relay nodes RNs or the number of mobile stations UEs subordinate to the radio base station DeNB, or a traffic amount.

The scheduling unit 23 is configured to perform scheduling for the relay node RN or the mobile station UE subordinate to the radio base station DeNB.

Specifically, the scheduling unit 23 is configured to perform scheduling such that the first downlink signal is transmitted to the relay node RN at the transmission timing (the first timing) of the MBSFN subframe.

(Operation of the mobile communication system according to the first embodiment of the present invention) With reference to FIG. 5 and FIG. 6, the operation of the mobile communication system according to the first embodiment of the present invention will be described.

Firstly, with reference to FIG. 5, the operation at the time of activation of the relay node RN used in the mobile communication system according to the first embodiment of the present invention will be described.

Figure 5:
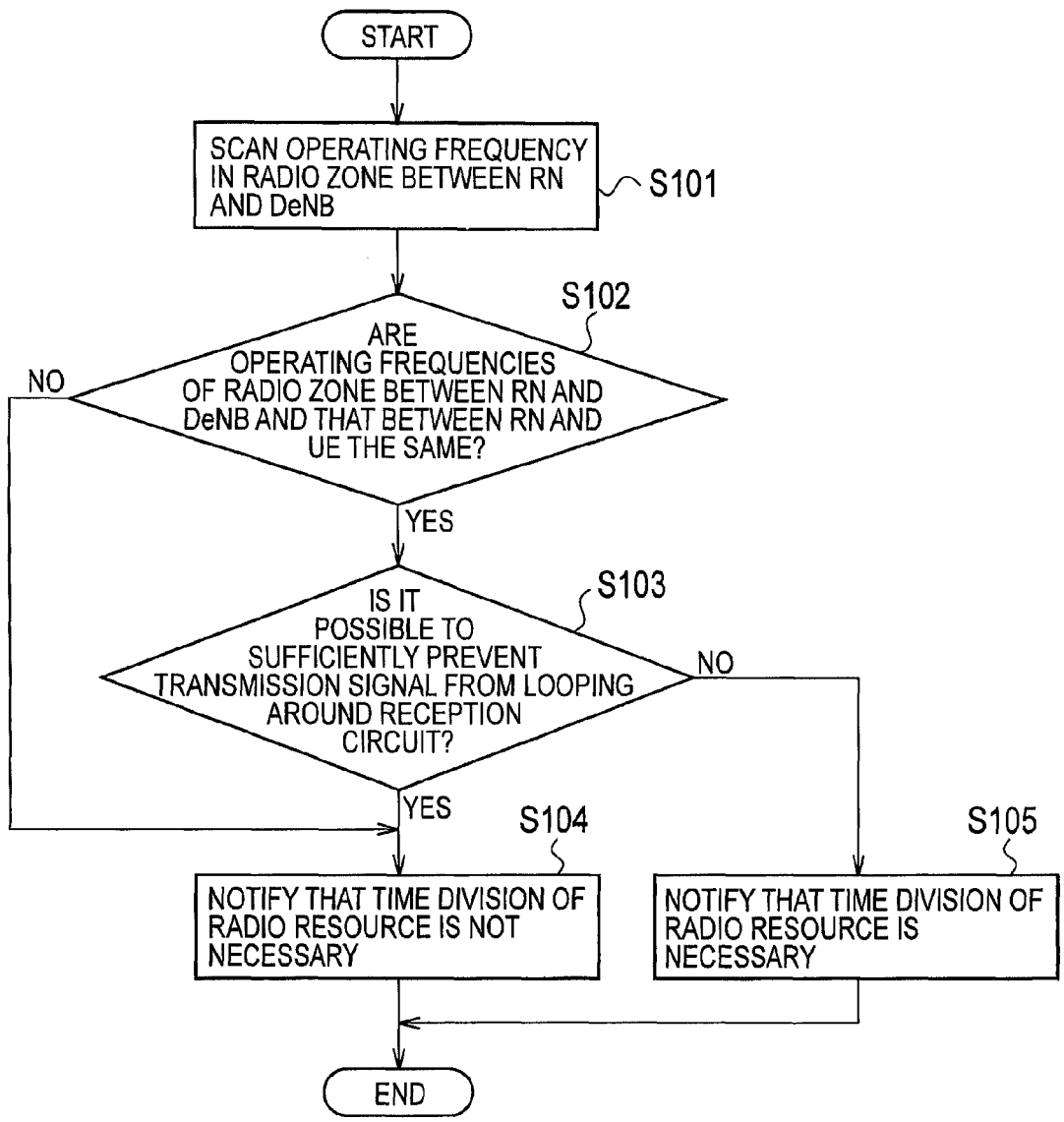
FIG. 5 is a flowchart illustrating an operation of the relay node according to the first embodiment of the present invention.

As illustrated in FIG. 5, in step S101, the relay node RN is activated and scans the second operating frequency used in the radio zone between the radio base station DeNB and the relay node RN with reference to broadcast information and the like transmitted by the radio base station DeNB.

In step S102, the relay node RN determines whether the first operating frequency used in the radio zone between the relay node RN and the mobile station UE is equal to the second operating frequency used in the radio zone between the radio base station DeNB and the relay node RN.

When the first operating frequency is equal to the second operating frequency, the present operation proceeds to step S103, and when the first operating frequency is different from the second operating frequency, the present operation proceeds to step S104.

In step S103, the relay node RN determines whether it is set so that the second downlink signal transmitted to the mobile station UE can be sufficiently prevented from looping around the reception circuit 12A for a Un radio bearer.

When it is determined that the sufficient prevention has been set, the present operation proceeds to step S104, and when it is determined that the sufficient prevention has not been set, the present operation proceeds to step S105.

In step S104, the relay node RN determines that it is not necessary to perform the scheduling at the second timing such that the second timing does not overlap the first timing in the time direction, that is, time division of a radio resource is not necessary, and notifies the radio base station DeNB of this determination.

In step S105, the relay node RN determines that it is necessary to perform the scheduling at the second timing such that the second timing does not overlap the first timing in the time direction, that is, the time division of the radio resource is necessary, and notifies the radio base station DeNB of this determination.

Secondly, with reference to FIG. 6, an operation when the RRC connection is set between the radio base station DeNB and the relay node in the mobile communication system according to the first embodiment of the present invention will be described.

Figure 6:
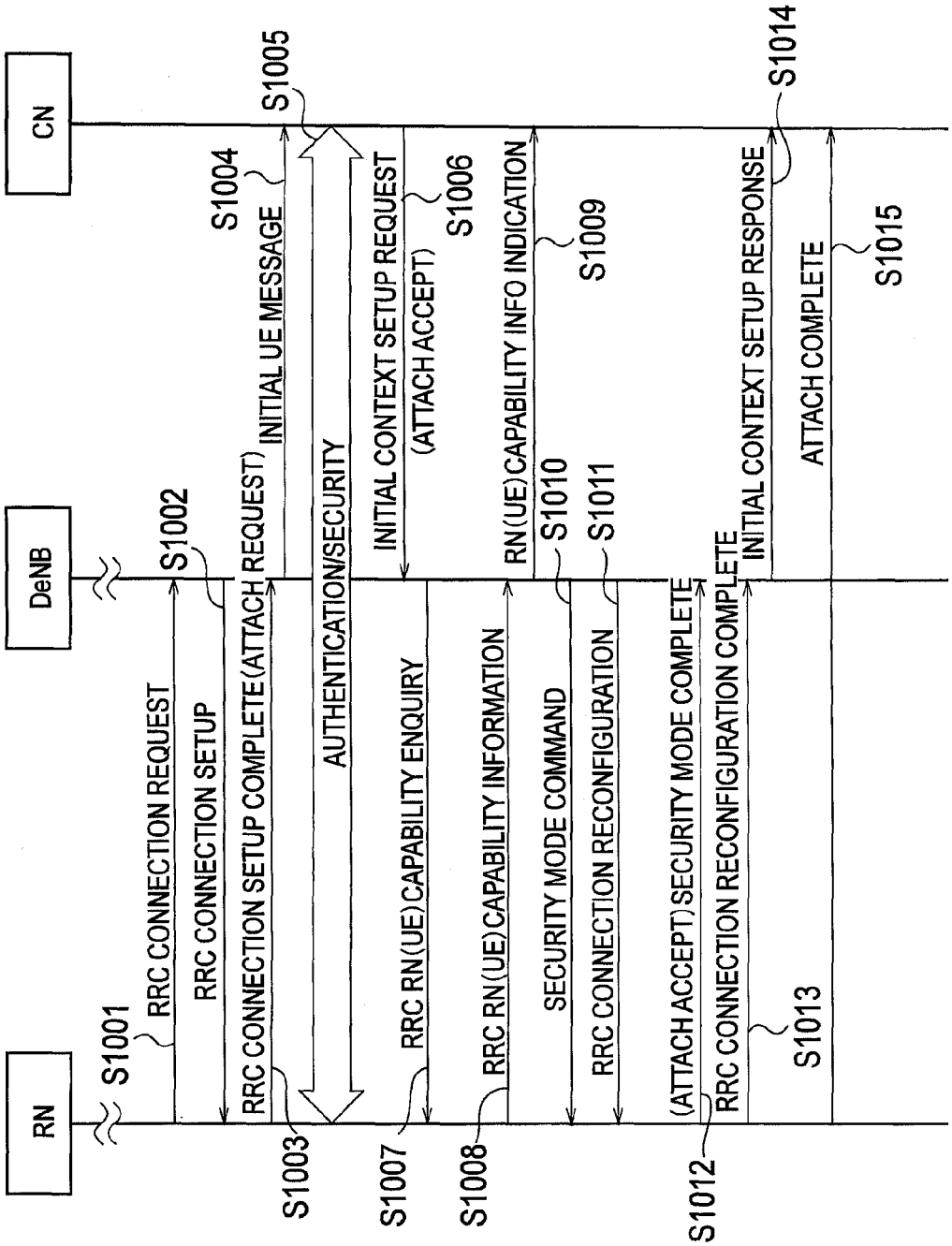
FIG. 6 is a sequence diagram illustrating an operation of the mobile communication system according to the first embodiment of the present invention.

As illustrated in FIG. 6, in step S1001, when the relay node RN is activated, it transmits "RRC Connection Request" to the radio base station DeNB.

In step S1002, the radio base station DeNB determines that the "RRC Connection Request" has been transmitted from the relay node RN based on a flag set in the "RRC Connection Request", and transmits "RRC Connection Setup" to the relay node RN.

In step S1003, the relay node RN transmits "RRC Connection Setup Complete" including "Attach Request" to the radio base station DeNB.

In step S1004, the radio base station DeNB transmits "Initial UE Message" including the "Attach Request" to the core node CN.

In step S1005, "Authentication/Security process" is completed between the relay node RN and the core node CN, and in step S1006, the core node CN transmits "Initial Context Setup Request" including "Attach Accept" to the radio base station DeNB.

In step S1007, the radio base station DeNB transmits "RRC RN (UE) Capability Enquiry" to the relay node RN.

In step S1008, the relay node RN transmits "RRC RN (UE) Capability Information" to the radio base station DeNB.

Here, it is possible for the relay node RN to notify the radio base station DeNB of a determination result regarding whether it is necessary to perform the scheduling at the second timing such that the second timing does not overlap the above-mentioned first timing in the time direction, through a predetermined bit (for example, 1 bit) in the "RRC RN (UE) Capability Information".

In step S1009, the radio base station DeNB transmits "(UE) Capability Info Indication" to the core node CN.

The radio base station DeNB transmits "Security Mode Command" to the relay node RN in step S1010, and transmits "RRC Connection Reconfiguration" including the "Attach Accept" to the relay node RN in step S1011.

Here, it is possible for the radio base station DeNB to notify the relay node RN of the above-mentioned transmission timing of the MBSFN subframe through the "RRC Connection Reconfiguration" as necessary.

The relay node RN transmits "Security Mode Complete" to the radio base station DeNB in step S1012, and transmits "RRC Connection Reconfiguration Complete" to the radio base station DeNB in step S1013.

In step S1014, the radio base station DeNB transmits "Initial Context Setup Response" to the core node CN.

In step S1015, the relay node RN transmits "Attach Complete" to the core node CN.

Operation and Effect of the Mobile Communication System According to the First Embodiment of the Present Invention In accordance with the mobile communication system according to the first embodiment of the present invention, only when the influence of interference to the reception circuit of the relay node itself is large, the interference occurring when the transmission-and-reception process in the Un radio bearer and the transmission-and-reception process in the Uu radio bearer are simultaneously performed, the resource for reception of the first downlink signal transmitted by the radio base station DeNB through the Un radio bearer and the resource for transmission of the second downlink signal transmitted to the mobile station UE through the Uu radio bearer are switched in the time division manner, so that it is possible to efficiently use a radio resource and reduce the interference to the reception circuit of the relay node itself.

(First Modification)

With reference to FIG. 7, the first modification of the mobile communication system according to the above-mentioned first embodiment will be described. The following is a description of the mobile communication system according to the first modification, focusing on the points of difference from the mobile communication system according to the first embodiment described above.

Hereinafter, with reference to FIG. 7, the operation of the mobile communication system according to the first modification will be described.

As illustrated in FIG. 7, operations of step S2001 to step S2015 are equal to the operations of step S1001 to step S1015 illustrated in FIG. 6.

However, in step S2011, the radio base station DeNB does not notify the relay node RN of the above-mentioned transmission timing of the MBSFN subframe through the "RRC Connection Reconfiguration".

In step S2016, the relay node RN transmits "Un Setup Request" to the radio base station DeNB, wherein the "Un Setup Request" is used for requesting that a Un radio bearer required when the relay node RN serves as a radio relay base station be set between the relay node RN and the radio base station DeNB.

In step S2017, the radio base station DeNB transmits "Un Setup Response" to the relay node RN.

Here, the radio base station DeNB notifies the relay node RN of the above-mentioned transmission timing of the MBSFN subframe through the "Un Setup Response".

The characteristics of the present embodiment as described above may be expressed as follows.

A first characteristic of the present embodiment is summarized in that a mobile communication method includes: a step A of performing, by a radio base station DeNB, scheduling such that a first downlink signal is transmitted to a relay node RN at a first timing; a step B of performing, by the relay node RN, scheduling such that a second downlink signal is transmitted to a mobile station UE at a second timing; a step C of determining, by the relay node RN, whether it is necessary to perform the scheduling at the second timing such that the second timing does not overlap the first timing in the time direction, based on a first operating frequency f1 used in a radio zone between the relay node RN and the mobile station UE and a second operating frequency f2 used in a radio zone between the radio base station DeNB and the relay node RN; and a step D of notifying, by the relay node RN, the radio base station DeNB of the determination result.

In the first characteristic of the present embodiment, in step C, when the first operating frequency f1 is different from the second operating frequency f2, the relay node RN may also be configured to determine that it is not necessary to perform the scheduling at the second timing such that the second timing does not overlap the first timing in the time direction.

In the first characteristic of the present embodiment, in step C, even when the first operating frequency f1 is equal to the second operating frequency f2, if it is set so that a second downlink signal is sufficiently prevented from looping around a reception circuit 12A for a Un radio bearer, the relay node RN may also determine that it is not necessary to perform the scheduling at the second timing such that the second timing does not overlap the first timing in the time direction.

In the first characteristic of the present embodiment, the mobile communication method may further include: a step of notifying, by the radio base station DeNB, the relay node RN of the first timing when an RRC connection is set between the radio base station DeNB and the relay node RN.

In the first characteristic of the present embodiment, the first timing may include a transmission timing of an MBSFN subframe.

A second characteristic of the present embodiment is summarized in that a relay node RN, which can set an RRC connection between a radio base station DeNB and the relay node RN, includes: a reception unit 16 configured to receive a first downlink signal transmitted from the radio base station DeNB at a first timing; a scheduling unit 18 configured to perform scheduling such that a second downlink signal is transmitted to a mobile station UE at a second timing; a determination unit 17 configured to determine whether it is necessary to perform the scheduling at the second timing such that the second timing does not overlap the first timing in the time direction, based on a first operating frequency f1 used in a radio zone between the relay node RN and the mobile station UE and a second operating frequency f2 used in a radio zone between the radio base station DeNB and the relay node RN; and a transmission unit 15 configured to notify the radio base station DeNB of the determination result.

In the second characteristic of the present embodiment, when the first operating frequency f1 is different from the second operating frequency f2, the determination unit 17 may also be configured to determine that it is not necessary to perform the scheduling at the second timing such that the second timing does not overlap the first timing in the time direction.

In the second characteristic of the present embodiment, even when the first operating frequency f1 is equal to the second operating frequency f2, if it is set so that a second downlink signal is sufficiently prevented from looping around a reception circuit 12A for a Un radio bearer, the determination unit 17 may also be configured to determine that it is not necessary to perform the scheduling at the second timing such that the second timing does not overlap the first timing in the time direction.

In the second characteristic of the present embodiment, the reception unit 16 may also be configured to receive the first timing from the radio base station DeNB when an RRC connection is set between the radio base station DeNB and the relay node RN.

In the second characteristic of the present embodiment, the first timing may include a transmission timing of an MBSFN subframe.

In addition, the operation of the above-mentioned the radio base station DeNB, the relay node RN or mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the radio base station DeNB, the relay node RN or mobile station UE. As a discrete component, such storage medium and processor may be arranged in the radio base station DeNB, the relay node RN or mobile station UE.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

Industrial Applicability

As described above, in accordance with the present invention, it is possible to provide a mobile communication method capable of reducing interference to a reception circuit of a relay node itself, which occurs when a transmission-and-reception process in a Un radio bearer and transmission-and-reception process in a Uu radio bearer are simultaneously performed, and a relay node.

The invention claimed is:

1. A mobile communication method, comprising:
   a step A of performing, by a radio base station, scheduling such that a first downlink signal is transmitted to a relay node at a first timing;
   a step B of performing, by the relay node, scheduling such that a second downlink signal is transmitted to a mobile station at a second timing;
   a step C of determining, by the relay node, whether it is necessary to perform scheduling at the second timing such that the second timing does not overlap the first timing in a time direction, based on a first operating frequency used in a radio zone between the relay node and the mobile station and a second operating frequency used in a radio zone between the radio base station and the relay node;
   a step D of notifying, by the relay node, the radio base station of the determination result; and
   a further step of notifying, by the radio base station, the relay node of the first timing, if the radio base station receives a determination result indicating that it is necessary to perform scheduling at the second timing such that the second timing does not overlap the first timing in a time direction, when a Radio Resource Control (RRC) connection is set between the radio base station and the relay node.

2. The mobile communication method according to claim 1, wherein
   in the step C, when the first operating frequency is different from the second operating frequency, the relay node determines that it is not necessary to perform the scheduling at the second timing such that the second timing does not overlap the first timing in the time direction.

3. The mobile communication method according to claim 1, wherein
   in the step C, even when the first operating frequency is equal to the second operating frequency, if it is set so that a second downlink signal is sufficiently prevented from looping around a reception circuit, the relay node determines that it is not necessary to perform the scheduling at the second timing such that the second timing does not overlap the first timing in the time direction.

4. The mobile communication method according to claim 1, wherein
   the first timing includes a transmission timing of an MBSFN (Multicast Broadcast Single Frequency Network) subframe.

5. A relay node, which can set a connection between a radio base station and the relay node, the relay node comprising:
   a reception unit that receives a first downlink signal transmitted from the radio base station at a first timing;
   a scheduling unit that performs scheduling such that a second downlink signal is transmitted to a mobile station at a second timing;
   a determination unit that determines whether it is necessary to perform scheduling at the second timing such that the second timing does not overlap the first timing in a time direction, based on a first operating frequency used in a radio zone between the relay node and the mobile station and a second operating frequency used in a radio zone between the radio base station and the relay node; and a transmission unit that notifies the radio base station of the determination result;

wherein the reception unit receives the first timing from the radio base station, if the determination unit determines that it is necessary to perform scheduling at the second timing such that the second timing does not overlap the first timing in a time direction, when a Radio Resource Control (RRC) connection is set between the radio base station and the relay node.

6. The relay node according to claim 5, wherein when the first operating frequency is different from the second operating frequency, the determination unit determines that it is not necessary to perform the scheduling at the second timing such that the second timing does not overlap the first timing in the time direction.

7. The relay node according to claim 5, wherein even when the first operating frequency is equal to the second operating frequency, if it is set so that a second downlink signal is sufficiently prevented from looping around a reception circuit, the determination unit determines that it is not necessary to perform the scheduling at the second timing such that the second timing does not overlap the first timing in the time direction.

8. The relay node according to claim 5, wherein the first timing includes a transmission timing of an MBSFN (Multicast Broadcast Single Frequency Network) subframe.

* * * * *